US012717672B2

(12) United States Patent
Kang et al.

(10) Patent No.: US 12,717,672 B2
(45) Date of Patent: Aug. 25, 2026

(54) APPARATUS AND METHOD FOR PRE-ANALYZING MEMORY FAULT INFORMATION

(71) Applicant: UIF (University Industry Foundation), Yonsei University, Seoul (KR)

(72) Inventors: Sungho Kang, Seoul (KR); Hayoung Lee, Seoul (KR)

(73) Assignee: UIF (UNIVERSITY INDUSTRY FOUNDATION), YONSEI UNIVERSITY, Seoul (KR)

(*) Notice: Subject to any disclaimer, the term of this patent is extended or adjusted under 35 U.S.C. 154(b) by 0 days.

(21) Appl. No.: 18/795,537

(22) Filed: Aug. 6, 2024

(65) Prior Publication Data

US 2025/0094269 A1 Mar. 20, 2025

(30) Foreign Application Priority Data

Sep. 15, 2023 (KR) ........................ 10-2023-0123185

(51) Int. Cl.
*G06F 11/07* (2006.01)

(52) U.S. Cl.
CPC .......... *G06F 11/079* (2013.01); *G06F 11/073* (2013.01)

(58) Field of Classification Search
CPC ............................ G06F 11/079; G06F 11/073
See application file for complete search history.

(56) References Cited

U.S. PATENT DOCUMENTS 7,178,072 B2 2/2007 Mullins et al.
2012/0131396 A1* 5/2012 Jeong .................... G11C 29/72 714/718
2016/0179577 A1* 6/2016 Catthoor ............... G06Q 10/04 718/104

FOREIGN PATENT DOCUMENTS

KR 10-1211042 B1 12/2012
KR 20190062879 A * 6/2019 ............ G11C 29/72
KR 10-2026303 B1 9/2019

* cited by examiner

*Primary Examiner* — Bryce P Bonzo
*Assistant Examiner* — Audrey Emma Whitesell
(74) *Attorney, Agent, or Firm* — Maschoff Brennan

(57) ABSTRACT

A memory fault information pre-analysis according to the present disclosure includes a fault monitor, a fault counter, a must monitor, and a fault address collector, the fault memory receives fault data configured by a row address and a column address of a memory and stores a location where fault information about the fault data is stored in the fault counter, the must monitor, and the fault address collector, the fault counter stores a number of faults in a fault row and a fault column of the memory, the must monitor stores must fault information, and the fault address collector stores a row address and a column address of the fault data and whether it is a pivot fault.

1 Claim, 8 Drawing Sheets

[FIG. 1]
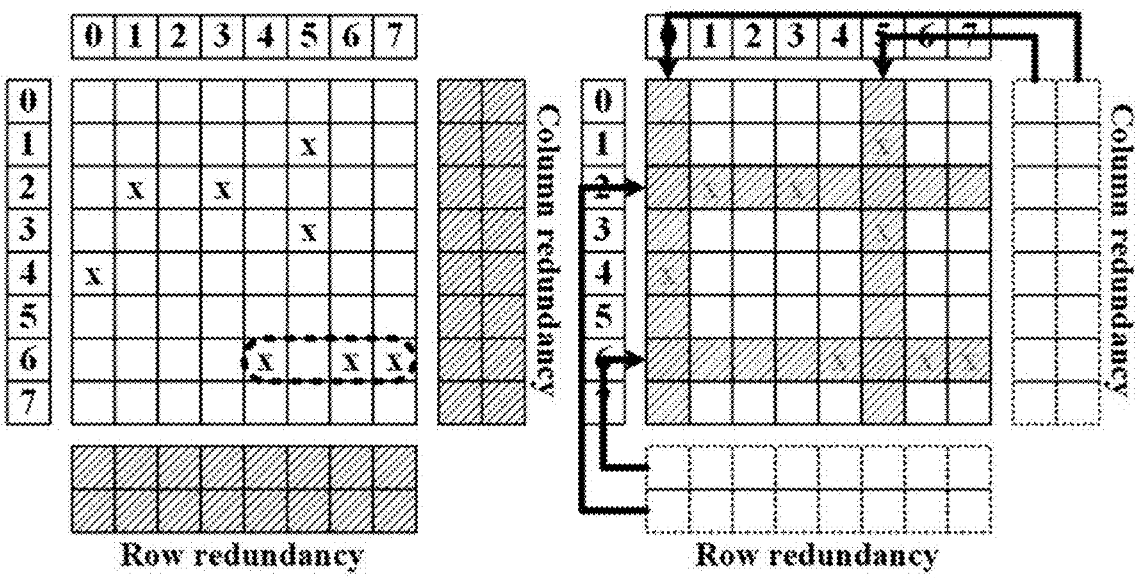

[FIG. 2]
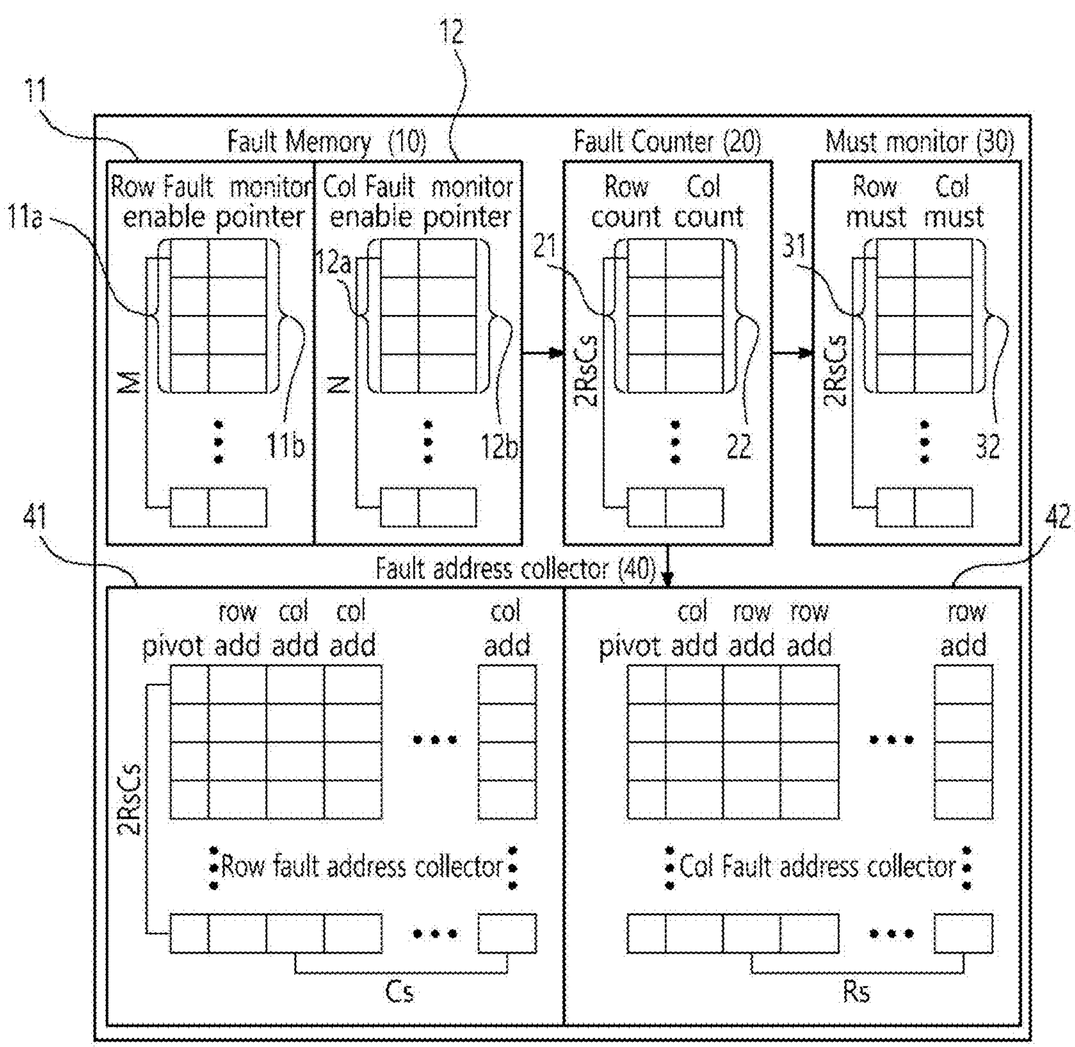

[FIG. 3]
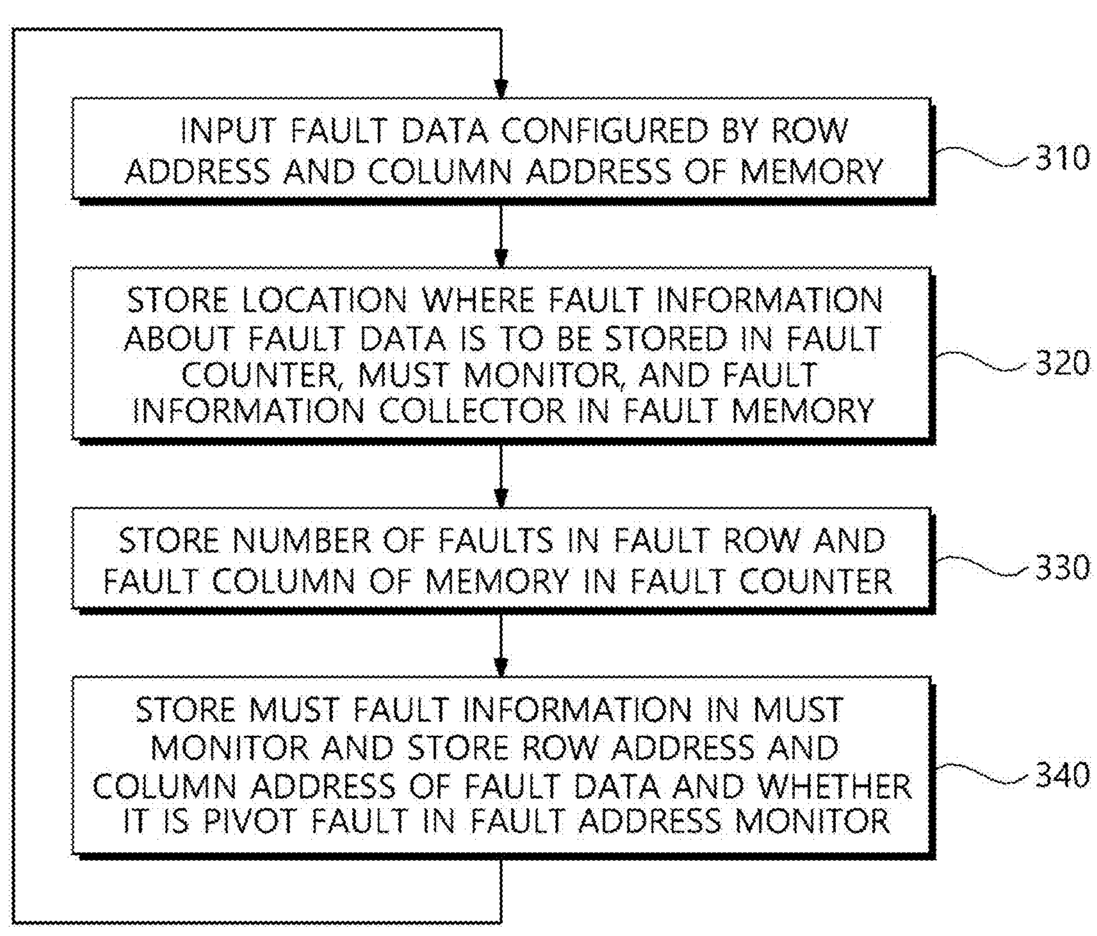

[FIG. 4]
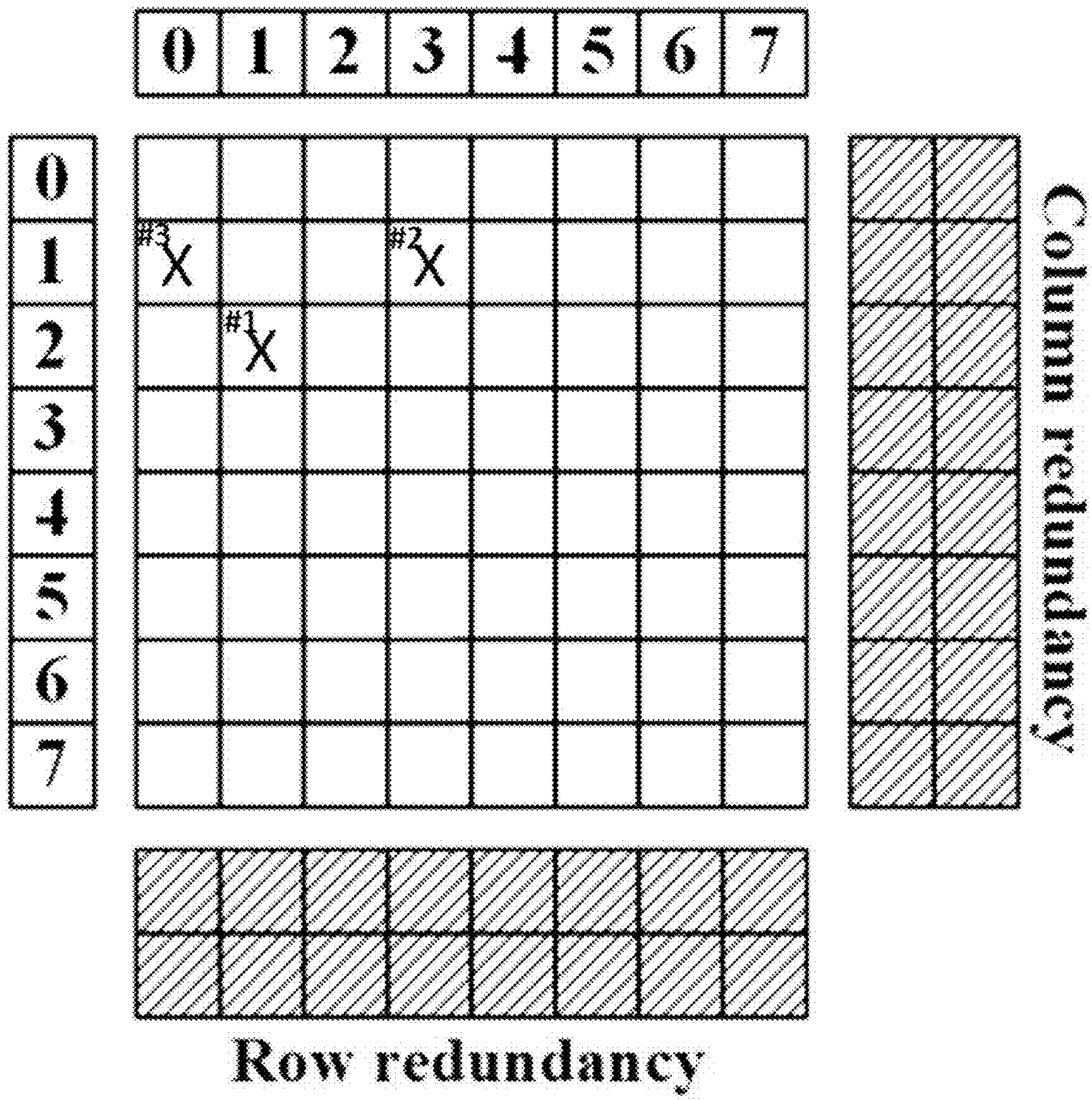

[FIG. 5A]
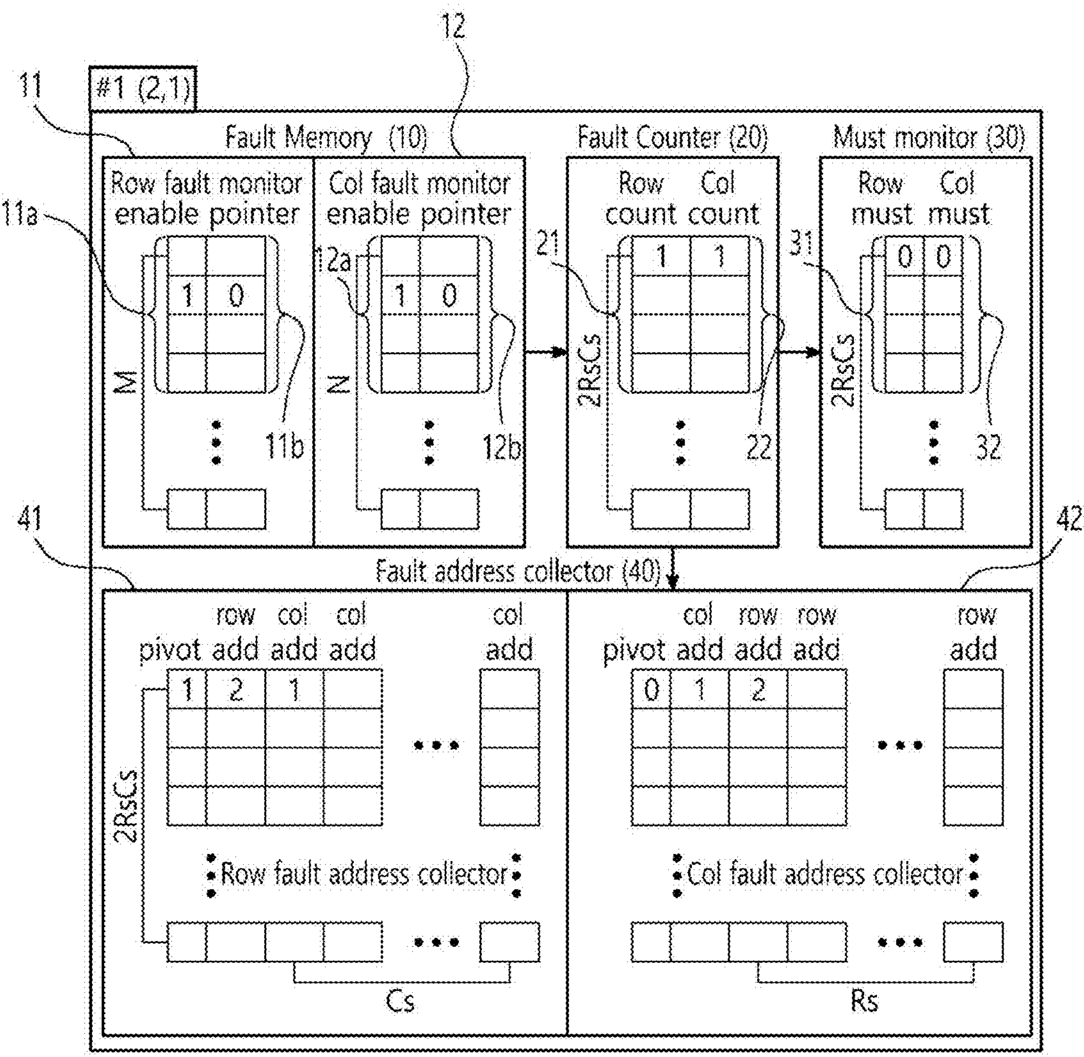
*M: memory row size / N: memory column size
*Rs: the number of row redundancies / Cs: the number of column redundancies

[FIG. 5B]
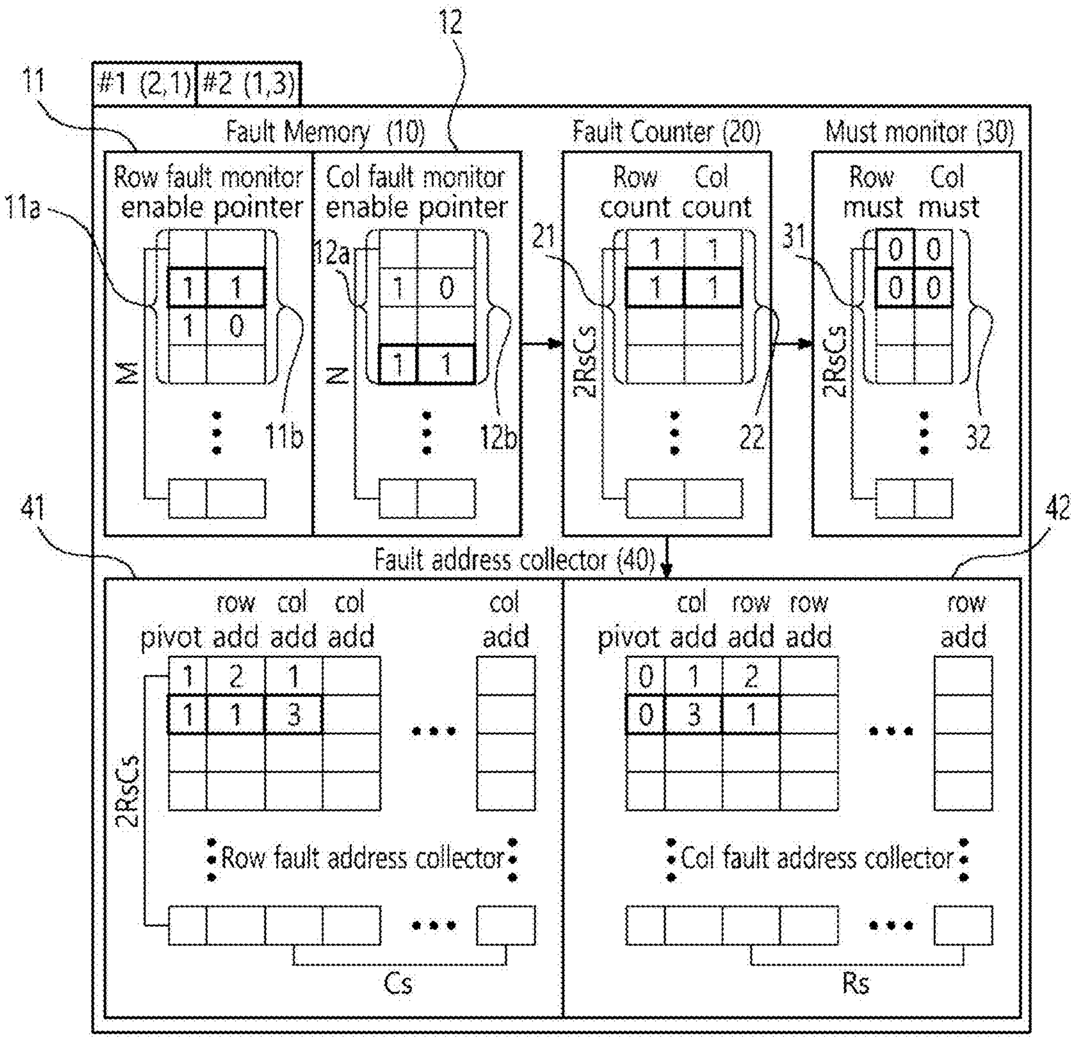

[FIG. 5C]
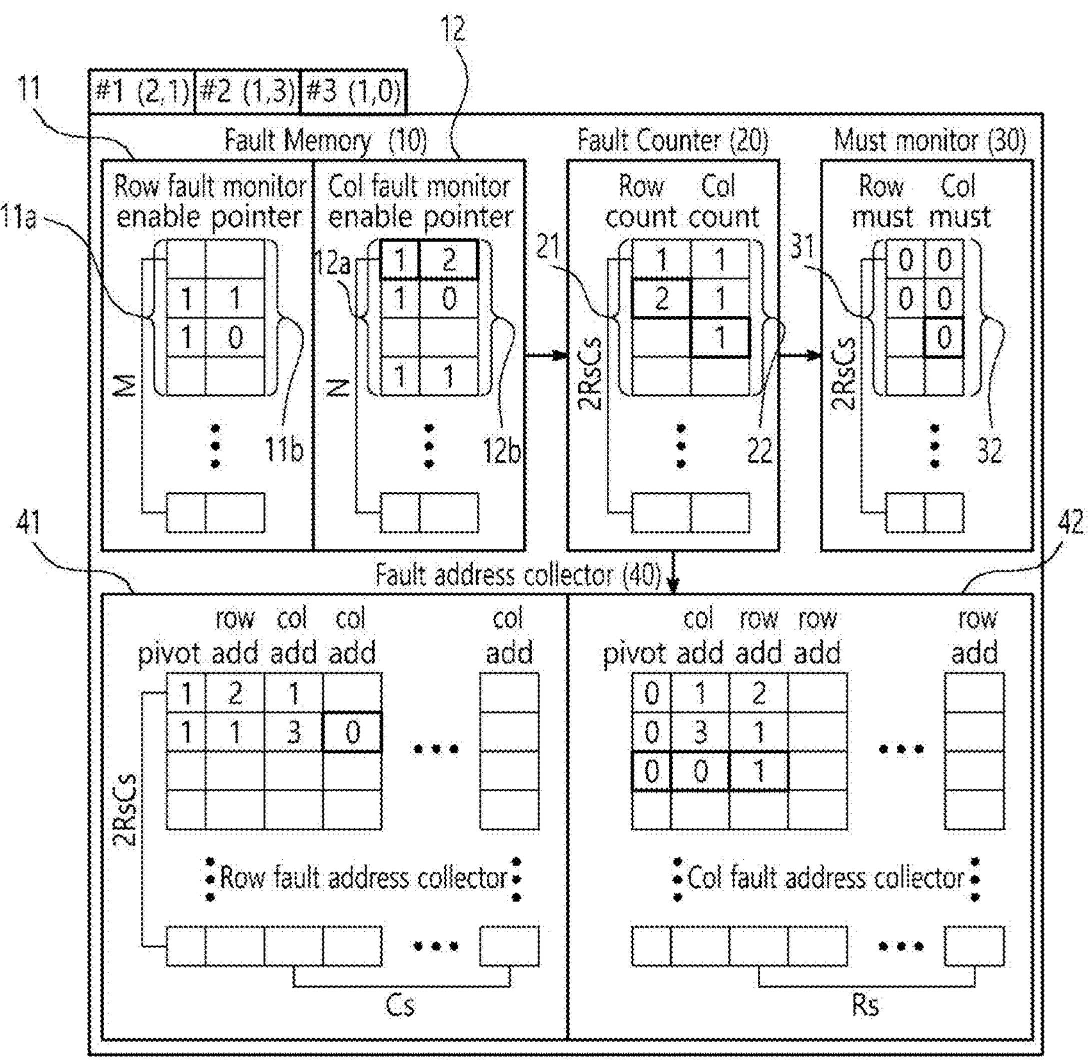
*M: memory row size / N: memory column size
*Rs: the number of row redundancies / Cs: the number of column redundancies

[FIG. 6]
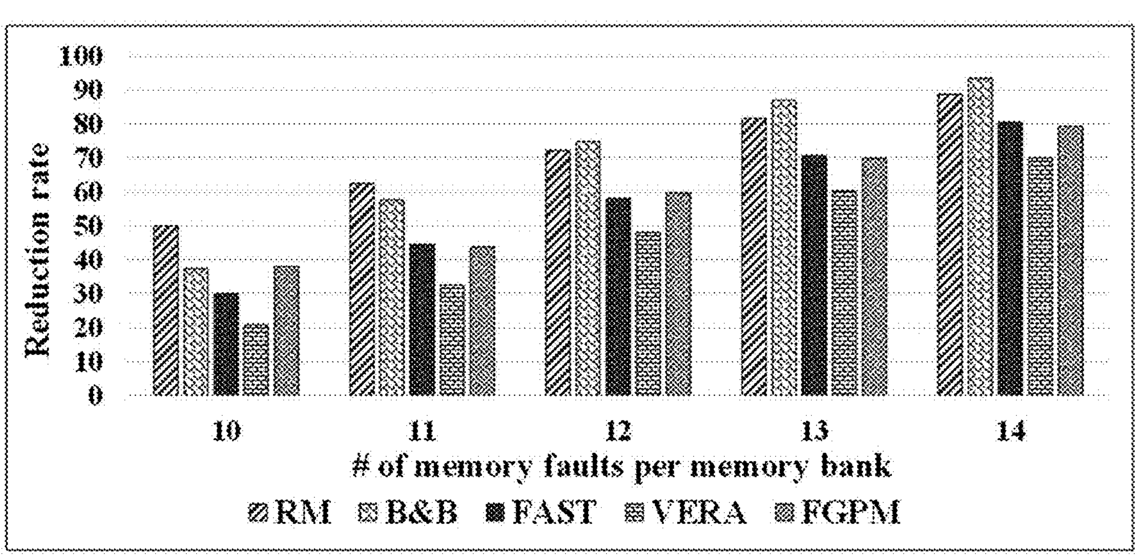

APPARATUS AND METHOD FOR PRE-ANALYZING MEMORY FAULT INFORMATION

CROSS-REFERENCE TO RELATED APPLICATIONS

This application claims priority to and the benefit of Korean Patent Application No. 10-2023-0123185 filed in the Korean Intellectual Property Office on Sep. 15, 2023, the entire contents of which are incorporated herein by reference.

BACKGROUND

Field

The present disclosure relates to an apparatus and a method for pre-analyzing memory fault information, and more particularly, to an apparatus and a method for pre-analyzing memory fault information to explore memory repair solutions.

Description of the Related Art

Memory test and repair are essential processes in a memory manufacturing process to improve memory yield. However, as the memory capacity continues to increase, the time required to test and repair the memory exponentially increases. The memory test and repair time should be reduced because it directly affects a memory manufacturing cost.

Since the introduction of memory test and repair to improve the yield of the memory, various memory repair solution exploration algorithms have been proposed. Even though the corresponding algorithms include an efficient fault analysis method and a memory spare resource deployment method to reduce the memory repair time, for the current time when the memory capacity continues to increase, the memory repair time reduction based on the corresponding algorithm does not achieve the sufficient time reduction. Further, it is no longer believed that there is no method for remarkably reducing the total memory test and repair time by proposing just a new memory repair solution exploration algorithm. Accordingly, a new approach for reducing the memory test and repair time and a method based on the approach are demanded.

SUMMARY

An object to be achieved by the present disclosure is to provide an apparatus and a method for pre-analyzing memory fault information which previously additional information required to find a memory repair solution while performing the memory test, simultaneously, to reduce a memory repair time without increasing the memory test time, thereby significantly reducing a memory manufacturing cost.

The technical object to be achieved by the present disclosure is not limited to the above-mentioned technical objects, and other technical objects, which are not mentioned above, can be clearly understood by those skilled in the art from the following descriptions.

In order to achieve the above-described technical object, according to an aspect of the present disclosure, a memory fault information pre-analysis apparatus includes a fault monitor, a fault counter, a must monitor, and a fault address collector, the fault memory receives fault data configured by a row address and a column address of a memory and stores a location where fault information about the fault data is stored in the fault counter, the must monitor, and the fault address collector, the fault counter stores a number of faults in a fault row and a fault column of the memory, the must monitor stores must fault information, and the fault address collector stores a row address and a column address of the fault data and whether it is a pivot fault.

The fault counter includes a row count flag which stores a number of faults in a fault row and a column count flag which stores a number of faults in a fault column.

The must monitor includes a row must flat indicating whether a fault row is a must fault and a column must flag indicating whether a fault column is a must fault.

The fault address collector includes a row fault address collector indicating a fault column address for every fault row address and whether it is a pivot fault and a column fault address collector indicating a fault row address for every fault column address and whether it is a pivot fault and The fault monitor includes a row fault monitor indicating a location where fault information for a fault row is to be stored and a column fault monitor indicating a location where fault information for a fault column is to be stored.

The row fault monitor includes an active flag indicating a fault row and a pointer flag indicating a location where the fault information is to be stored in the row count flag, the row must flag, and the row fault address collector.

The column fault monitor includes an active flag indicating a fault column and a pointer flag indicating a location where the fault information is to be stored in the column count flag, the column must flag, and the column fault address collector.

In order to achieve the above-described technical object, according to another aspect of the present disclosure, a memory fault information pre-analysis method of a memory fault information pre-analysis apparatus including a fault monitor, a fault counter, a must monitor, and a fault address collector, includes: (a) receiving fault data configured by a row address and a column address of a memory; (b) storing a location where fault information about the fault data is to be stored in the fault counter, the must monitor, and the fault address collector in the fault monitor; (c) storing a number of faults in a fault row and a fault column of the memory in the fault counter; (d) storing must fault information in the must monitor and a row address and a column address of the fault data and whether it is a pivot fault in the fault address collector.

The fault counter includes a row count flag which stores a number of faults in a fault row and a column count flag which stores a number of faults in a fault column and in step (c), the row count flag and the column count flag are updated according to the input fault data.

The must monitor includes a row must flat indicating whether a fault row is a must fault and a column must flag indicating whether a fault column is a must fault and in step (d), the row must flag and the column must flag are updated according to the input fault data.

The fault address collector includes a row fault address collector indicating a fault column address for every fault row address and whether it is a pivot fault and a column fault address collector indicating a fault row address for every fault column address and whether it is a pivot fault and in step (d), the row fault address collector and the column fault address collector are updated according to the input fault data.

The fault monitor includes a row fault monitor indicating a location where fault information for a fault row is to be stored and a column fault monitor indicating a location where fault information for a fault column is to be stored and in step (b), the row fault monitor and the column fault monitor are updated according to the input fault data.

The row fault monitor includes an active flag indicating a fault row and a pointer flag indicating a location where the fault information is to be stored in the row count flag, the row must flag, and the row fault address collector.

The column fault monitor includes an active flag indicating a fault column and a pointer flag indicating a location where the fault information is to be stored in the column count flag, the column must flag, and the column fault address collector.

In order to achieve the above-described technical object, according to another aspect of the present disclosure, a computer program is stored in a computer readable storage medium to allow a computer to execute the memory fault information pre-analysis method.

According to the present disclosure, additional information required to find a memory repair solution is previously analyzed while performing the memory test, simultaneously, to reduce a memory repair time without increasing the memory test time, thereby significantly reducing a memory manufacturing cost.

Effects of the present disclosure are not limited to the above-mentioned effects, and other effects, which are not mentioned above, can be clearly understood by those skilled in the art from the following descriptions.

BRIEF DESCRIPTION OF THE DRAWINGS

FIG. 1 illustrates an example of memory repair;

FIG. 2 illustrates a structure of a memory fault information pre-analysis apparatus according to an exemplary embodiment of the present disclosure;

FIG. 3 illustrates a flowchart of a memory fault information pre-analysis method according to an exemplary embodiment of the present disclosure;

FIG. 4 illustrates an example of: fault data for explaining an operation example according to an exemplary embodiment of the present disclosure;

FIGS. 5A to 5C are views for explaining an operation example according to an exemplary embodiment of the present disclosure when fault data of FIG. 4 is input; and FIG. 6 illustrates a reduction rate of time in each memory repair solution exploration technique by the present disclosure.

DETAILED DESCRIPTION OF THE EMBODIMENT

Hereinafter, exemplary embodiments of the present disclosure will be described in detail with reference to the drawings. Substantially same components in the following description and the accompanying drawings may be denoted by the same reference numerals so that a redundant description will be omitted. Further, in the description of the exemplary embodiment, if it is considered that specific description of related known configuration or function may cloud the gist of the present disclosure, the detailed description thereof will be omitted.

Generally, memory fault data is simply stored while performing a memory test. As it enters a memory repair process immediately after completing the memory test, analysis of the stored memory fault data begins to ensure additional information required to explore a memory repair solution. However, according to the present disclosure, the memory fault information analysis to ensure the addition information is simultaneously performed while performing the memory test to significantly reduce the memory repair time without increasing the memory test time. Accordingly, according to the present disclosure, the total memory test and repair time which directly affects the memory manufacturing cost is reduced to reduce the memory manufacturing cost.

FIG. 1 illustrates an example of memory repair. As illustrated in the drawing, a memory spare resource is configured by two types in a row direction and a column direction (row redundancy and column redundancy) and the row redundancy and the column redundancy are efficiently deployed according to a type of the fault to perform the memory repair. Here, a must fault is an important issue which is represented by dotted lines in FIG. 1. The column redundancy is not sufficient so that the must fault cannot be repaired with the column redundancy, but can be repaired only with the row redundancy. As described above, a fault group which can be repaired only with one of two types of redundancies is referred to as a must fault. The must faults can be repaired only with one type resource so that a repair solution is specified. Therefore, locations of specific faults in the must fault are not important and the memory repair may be satisfactorily finished only with must information (row address or column address) in which the must fault occurs.

FIG. 2 illustrates a structure of a memory fault information pre-analysis apparatus according to an exemplary embodiment of the present disclosure;

A memory fault information pre-analysis apparatus according to an exemplary embodiment includes a fault monitor 10, a fault counter 20, a must monitor 30, and a fault address collector 40.

When the fault data which is configured by a row address and a column address of the memory is input to the memory fault information pre-analysis apparatus, additional information required to explore a memory repair solution later is stored in the fault monitor 10, the fault counter 20, the must monitor 30, and the fault address collector 40 step by step.

The fault monitor 10 receives fault data and stores a location about rows of the fault monitor 10, the fault counter 20, the must monitor 30, and the fault address collector 40 where the additional fault information about the fault data is to be stored. The fault monitor 10 includes a row fault monitor 11 which indicates a location where fault information about the fault row is to be stored and a column fault monitor 12 which indicates a location where fault information about the fault column is to be stored. The fault monitor 10 needs to express all row addresses and column addresses of the memory so that sizes of the row fault monitor 11 and the column fault monitor 12 may be equal to a size M of the row and a size N of the column of each memory.

The fault counter 20 stores a number of faults in the fault row and the fault column of the memory. The fault counter 20 includes a row count flag 21 which stores a number of faults in the fault row and a column count flat 22 which stores a number of faults in the fault column.

The must monitor 30 stores must fault information. The must monitor 30 includes a row must flag 31 indicating whether the fault row is a must fault and a column must flag 30 indicating whether the fault column is a must fault.

The fault address collector 40 stores a row address and a column address of the fault data and whether it is a pivot fault. The fault address collector 40 includes a row fault address collector 41 indicating a fault column address for every fault row address and whether it is a pivot fault and a column fault address collector 42 indicating a fault row address for every fault column address and whether it is a pivot fault.

The row fault monitor 11 includes an active flag 11*a* indicating a fault row and a pointer flag 11*b* indicating a location where the fault information is to be stored in the row count flag 21, the row must flag 31, and the row fault address collector 41.

The column fault monitor 12 includes an active flag 12*a* indicating a fault column and a pointer flag 12*b* indicating a location where the fault information is to be stored in the column count flag 22, the column must flag 32, and the column fault address collector 42.

When a number of row lines of the row redundancy is Rs and a number of column lines of the column redundancy is Cs, the number of rows of the fault counter 20, the must monitor 30, and the fault address collector 40 may be selected as 2RsCs. This is because the information which requires repair is collected in the must monitor 30. Accordingly, when a must repair condition is satisfied by the must monitor 30, it is not necessary to collect the corresponding information other than the must repair address. In other words, the number of memory row (column) lines to be repaired with the row or column redundancy is Rs(Cs) and Rs(Cs) or more of memory faults in each memory row (column) line are not necessary due to the must repair condition of the memory repair.

FIG. 3 illustrates a flowchart of a memory fault information pre-analysis method according to an exemplary embodiment of the present disclosure.

In step 310, fault data configured by a row address and a column address of a memory is input.

In step 320, a location where the fault information about the input fault data is to be stored in the fault counter 20, the must monitor 30, and the fault information collector 40 is stored in the fault monitor 10. That is, the active flag 11*a* and the pointer flag 11*b* of the row fault monitor 11 and the active flag 12*a* and the pointer flag 12*b* of the column fault monitor 12 are updated according to the input fault data.

In step 330, a number of faults in the fault row and the fault column of the memory is stored in the fault counter 20. That is, the row count flag 21 and the column count flag 22 of the fault counter 20 are updated according to the input fault data.

In step 340, the must fault information is stored in the must monitor 30 and the row address and the column address of the fault data and whether it is a pivot fault are stored in the fault address collector 40. That is, the row must flag 31 and the column must flag 32 of the must monitor 30 are updated according to the input fault data and the row fault address collector 41 and the column fault address collector 42 of the fault address collector 40 are updated.

In step 340, the row address and the column address of the fault data are stored in the fault address collector 40 through a pivot test. It is confirmed whether the fault shares a row address and a column address with other pivot fault by the pivot test and if the fault does not share the row address and the column address, the fault data is classified as a pivot fault. Thereafter, even though the fault data which shares the row address and the column address with a previously stored pivot fault is input, the time when the pivot fault is found is important, so that the pivot fault specification is not cancelled.

The steps of FIG. 3 are repeated whenever new fault data is input.

FIG. 4 illustrates an example of fault data for explaining an operation example according to an exemplary embodiment of the present disclosure. For the convenience of description, an example that first fault data #1 (2, 1), second fault data #2 (1, 3), and third fault data #3 (1, 0) are sequentially input will be described.

FIGS. 5A to 5C are views for explaining an operation example according to an exemplary embodiment of the present disclosure when fault data of FIG. 4 is input.

FIG. 5A illustrates a result of updating the fault monitor 10, the fault counter 20, the must monitor 30, and the fault address collector 40 by inputting the fault data #1 (2, 1).

When the fault data #1 (2, 1) is input, in step 320, the fault monitor 10 is updated. A row address of the fault data #1 is 2 so that an active flag 11*a* in a third line of the row fault monitor 11 is set to 1 and the corresponding pointer flag 11*b* is set to 0. This is because a memory row 2 is detected as a first row with the fault. Accordingly, a storage location of fault information about the memory row 2 with the fault is determined as first lines in the fault counter 20, the must monitor 30, and the fault address collector 40. Likewise, a column address of the fault data #1 (2, 1) is 1 so that an active flag 12*a* in a second line of the column fault monitor 12 is set to 1 and the corresponding pointer flag 12*b* is set to 0. Accordingly, a storage location of fault information about the memory column 1 with the fault is also determined as first lines of the fault counter 20, the must monitor 30, and the fault address collector 40.

In step 330, a storage location of the memory row 2 with a fault is a first line of the fault counter 20 so that a row count flag 21 of the corresponding line is set to 1. Likewise, a storage location of the memory column 1 with a fault is a first line of the fault counter 20 so that a column count flag 22 of the corresponding line is set to 1.

In step 340, a storage location of a memory row 2 with a fault is a first line of the fault address collector 40 so that the row address and the column address of the fault data #1 (2, 1) are stored in the first line of the row fault address collector 41. Likewise, a storage location of a column 1 with a fault is a first line of the fault address collector 40 so that the column address and the row address of the fault data #1 (2, 1) are stored in the first line of the column fault address collector 42. Further, the fault data #1 (2, 1) does not share the row address or the column address with another memory fault so that the corresponding pivot flag is set to 1. In this case, both the row fault address collector 41 and the column fault address collector 42 have corresponding pivot flags so that one of them is set to 1. Simultaneously, when the fault data #1 (2, 1) is input, the must repair condition is not satisfied so that the row must flag 31 and the column must flag 32 of the first line of the must monitor 30 are set to 0.

FIG. 5B illustrates a result of updating the fault monitor 10, the fault counter 20, the must monitor 30, and the fault address collector 40 by inputting the fault data #2 (1, 3).

When the fault data #2 (1, 3) is input, in step 320, the fault monitor 10 is updated. A row address of the fault data #2 is 1 so that an active flag 11*a* in a second line of the row fault monitor 11 is set to 1 and the correspond pointer flag 11*b* is set to 1. This is because a memory row 1 is detected as a second row with a fault. Accordingly, a storage location of fault information about the memory row 1 with the fault is determined as second lines in the fault counter 20, the must monitor 30, and the fault address collector 40. Likewise, a column address of the fault data #2 (1, 3) is 3 so that an active flag 12*a* in a fourth line of the column fault monitor 12 is set to 1 and the corresponding pointer flag 12*b* is set to 1. Accordingly, a storage location of fault information about the memory column 3 with the fault is determined as second lines of the fault counter 20, the must monitor 30, and the fault address collector 40.

In step 330, a storage location of the memory row 1 with a fault is a second line of the fault counter 20 so that a row count flag 21 of the corresponding line is set to 1. Likewise, a storage location of the memory column 3 with a fault is a second line of the fault counter 20 so that a column count flag 22 of the corresponding line is set to 1.

In step 340, a storage location of a memory row 1 with a fault is a second line of the fault address collector 40 so that the row address and the column address of the fault data #2 (1, 3) are stored in the second line of the row fault address collector 41. Likewise, a storage location of a column 3 with a fault is a second line of the fault address collector 40 so that the column address and the row address of the fault data #2 (1, 3) are stored in the second line of the column fault address collector 42. Further, the fault data #2 (1, 3) does not share the row address or the column address with another memory fault so that the corresponding pivot flag is set to 1. In this case, both the row fault address collector 41 and column fault address collector 42 have corresponding pivot flags so that one of them is set to 1. Simultaneously, when the fault data #2 (1, 3) is input, the must repair condition is not satisfied so that the row must flag 31 and the column must flag 32 of the second line of the must monitor 30 are set to 0.

FIG. 5C illustrates a result of updating the fault monitor 10, the fault counter 20, the must monitor 30, and the fault address collector 40 by inputting the fault data #3 (1, 0).

When the fault data #3 (1, 0) is input, the row fault monitor 11 already has a corresponding row address so that the row fault monitor 11 is not updated. Accordingly, in step 320, only the column fault monitor 12 is updated. A column address of the fault data #3 (1, 0) is 0 so that an active flag 12*a* of the first line of the column fault monitor 12 is set to 1 and 0 and 1 are already used for the column fault monitor 12 so that the corresponding pointer flag 12*b* is set to 2. That is, a storage location of fault information about the memory column 0 with the fault is determined as third lines of the fault counter 20, the must monitor 30, and the fault address collector 40.

In step 330, a storage location of the memory row 1 with a fault is a second line of the fault counter 20 so that the row count flag 21 of the second line is increased to 2 and a storage location of the memory column 0 with a fault is a third line of the fault counter 20 so that the column count flag 22 of the corresponding line is set to 1.

In step 340, a storage location of the memory row 1 with a fault is the second line of the fault address collector 40 so that even though there is a memory fault in the same line, only the column address of the input fault data is stored in the row fault address collector 41 of the second line. Accordingly, the column address 0 is stored in the second line of the row fault address collector 41. However, in the column fault address collector 42, the storage location of the memory column 0 with a fault is a third line of the fault address collector 40 so that a row address and a column address of the fault data #3 (1, 0) are stored in the third line of the column fault address collector 42. The fault data #3 (1, 0) shares the row address 1 with the fault data #2 (1, 3) so that the corresponding pivot flat is set to 0. Simultaneously, when the fault data #3 (1, 0) is input, the must repair condition is not satisfied so that the column must flag 32 of the third line of the must monitor 30 is set to 0.

Similarly, another memory fault information may be collected by the memory fault information pre-analysis apparatus. Further, a step 320 for third fault data, a step 330 for second fault data, and a step 340 for first fault data may be processed in parallel. Accordingly, the fault data required to explore the memory repair solution may be collected without an additional buffer.

The memory fault information pre-analysis apparatus and method according to the present disclosure are used to reduce the memory repair time. This is because the information used during the exploration of the memory repair solution has been completely collected in a memory test step before beginning the memory repair. A number of faults of each fault memory line and a fault location are already stored in the memory fault information pre-analysis apparatus according to the present disclosure. When allocation of a spare resource is considered in the memory repair, the number and the location of faults may help to assign a priority to allocation of the spare resource. Accordingly, the memory repair solution may be quickly found from all the repair solution exploration algorithms. Further, in most repair solution exploration algorithms, all possible resource allocation cases are considered to improve a repair rate. The number of faults and location information which are stored in advance according to the present disclosure help to quickly find an optimal repair solution. In this case, a search of a repair solution which requires spare resources more than the previously searched repair solution is omitted so that the memory repair time may be reduced. Further, in the memory fault information pre-analysis apparatus according to the present disclosure, information about the pivot fault is also included. It means that when the spare resource is allocated to the pivot fault, a non-pivot fault related to the pivot fault which shares the same row or column address is also allocated together. In other words, a deployment priority of the memory spare resource is provided to quickly find the memory repair solution from all the repair solution exploration algorithms.

Additionally, information about the pivot fault facilitates early termination of a non-repairable memory. This significantly affects the reduction of the memory repair time. This is because in the non-repairable memory, a memory repair solution exploration time is much longer than that of the reparable memory due to the number of cases of complex fault analysis and various spare resource deployments. Accordingly, the repair solution exploration time of the non-reparable memory occupies the most of the total memory repair time. According to the exemplary embodiment of the present disclosure, the information about the pivot fault enables the early termination for the repair solution exploration of the non-repairable memory. When the number of pivot faults is simply larger than the number of spare resources, it is determined that the memory cannot be repaired. This is because when a new pivot fault occurs, it means a new memory fault which cannot be covered by the allocation of the spare resource for another fault. As described above, according to the exemplary embodiment of the present disclosure, various memory fault information is additionally collected so that the memory repair time is significantly reduced.

FIG. 6 illustrates a reduction rate of time in various memory repair solution exploration techniques by the present disclosure. Referring to FIG. 6, the time reduction rate is slightly different according to the memory repair solution exploration technique, but according to the present disclosure, an average time reduction rate is approximately 61.58% which indicates that the memory repair time can be reduced.

The memory fault information pre-analysis apparatus according to the exemplary embodiments of the present disclosure may be implemented in a logic circuit by hardware, firm ware, software, or a combination thereof or may be implemented using a general purpose or special purpose computer. The apparatus may be implemented using hard-wired device, field programmable gate array (FPGA) or application specific integrated circuit (ASIC). Further, the apparatus may be implemented by a system on chip (SoC) including one or more processors and a controller.

The memory fault information pre-analysis apparatus according to the exemplary embodiment of the present disclosure may be mounted in a computing device or a server provided with a hardware element as a software, a hardware, or a combination thereof. The computing device or server may refer to various devices including all or some of a communication device for communicating with various devices and wired/wireless communication networks such as a communication modem, a memory which stores data for executing programs, and a microprocessor which executes programs to perform operations and commands.

The operation according to the exemplary embodiment of the present disclosure may be implemented as a program command which may be executed by various computers to be recorded in a computer readable medium. The computer readable medium indicates an arbitrary medium which participates to provide a command to a processor for execution. The computer readable medium may include solely a program command, a data file, and a data structure or a combination thereof. For example, the computer readable medium may include a magnetic medium, an optical recording medium, and a memory. The computer program may be distributed on a networked computer system so that the computer readable code may be stored and executed in a distributed manner. Functional programs, codes, and code segments for implementing the present embodiment may be easily inferred by programmers in the art to which this embodiment belongs.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

What is claimed is:

1. A memory fault information pre-analysis method of a memory fault information pre-analysis apparatus including a fault monitor, a fault counter, a must monitor, and a fault address collector, the memory fault information pre-analysis method comprising:

(a) receiving, at a fault memory, fault data configured by a row address and a column address of a memory;

(b) storing a location where fault information about the fault data is to be stored in the fault counter, the must monitor, and the fault address collector in the fault monitor, wherein the fault monitor includes a row fault monitor indicating a location where fault information for a fault row is to be stored and a column fault monitor indicating a location where fault information for a fault column is to be stored, and wherein the row fault monitor and the column fault monitor are updated according to the fault data;

(c) storing a number of faults in a fault row and a fault column of the memory in the fault counter, wherein the fault counter includes a row count flag which stores a number of faults in a fault row and a column count flag which stores a number of faults in a fault column, and wherein the row count flag and the column count flag are updated according to the fault data; and (d) storing must fault information in the must monitor and a row address and a column address of the fault data and pivot fault status in the fault address collector, wherein the must monitor includes a row must flag indicating must fault status of a fault row and a column must flag indicating the must fault status of a fault column, and wherein the fault address collector includes:

a row fault address collector indicating a fault column address and pivot fault status for every fault row address, and a column fault address collector indicating a fault row address and the pivot fault status for every fault column address, the pivot fault status being set by a pivot flag to 1 for pivot faults and to 0 for non-pivot faults, wherein the row fault address collector and the column fault address collector are updated according to the fault data, wherein the row fault monitor includes a first active flag indicating a fault row and a first pointer flag indicating a location where the fault information is to be stored in the row count flag, the row must flag, and the row fault address collector, and wherein the column fault monitor includes a second active flag indicating a fault column and a second pointer flag indicating a location where the fault information is to be stored in the column count flag, the column must flag, and the column fault address collector.

* * * * *